United States Patent [19]

Nilsson et al.

[11] 3,971,570
[45] July 27, 1976

[54] BELT LOCKING ARRANGEMENT FOR A PASSIVE BELT SYSTEM FOR AUTOMOBILES

[76] Inventors: Karl Erik Nilsson, Rontgenstrasse 30, 8012 Ottobrunn; Reiner van Riesen, Besenheide 36, 2200 Elmshorn, both of Germany

[22] Filed: Mar. 3, 1975

[21] Appl. No.: 554,702

[30] Foreign Application Priority Data

Mar. 1, 1974 Germany.............................. 2409835

[52] U.S. Cl................................. 280/746; 297/389
[51] Int. Cl.² ........................................ B60R 21/10
[58] Field of Search ............ 280/150 SB; 180/82 C; 297/389; 24/230 AT

[56] References Cited
UNITED STATES PATENTS

| 2,858,144 | 10/1958 | Oppenheim................... 280/150 SB |
| 3,146,846 | 9/1964 | Gutshall........................... 180/82 C |
| 3,822,760 | 7/1974 | Lindblad................... 280/150 SB X |
| 3,833,239 | 9/1974 | Coenan......................... 280/150 SB |
| 3,881,745 | 5/1975 | Chavez, Jr..................... 280/150 SB |

FOREIGN PATENTS OR APPLICATIONS

| 1,350,887 | 12/1963 | France............................ 24/230 AT |
| 326,459 | 5/1935 | Italy................................ 24/230 AT |

Primary Examiner—M. H. Wood, Jr.
Assistant Examiner—Michael J. Forman
Attorney, Agent, or Firm—McGlew and Tuttle

[57] ABSTRACT

The invention provides a belt locking arrangement for a passive safety belt system for automobiles in which the belt lock is movable along a guide on the inside of a vehicle door by an auxiliary power drive, connected to the lock via a flexible push-pull member that runs in a guide sleeve in a wall of the door, and which has a slot through which a transporter slide, connected to the push-pull member and the lock, extends. When operated the lock engages with the lock tongue rigidly fixed to the body of the vehicle.

5 Claims, 6 Drawing Figures

BELT LOCKING ARRANGEMENT FOR A PASSIVE BELT SYSTEM FOR AUTOMOBILES

FIELD AND BACKGROUND OF THE INVENTION

The invention relates to a belt locking arrangement for a passive safety belt system for automobiles, in which the belt lock is movable by an auxiliary power drive, independently of the force of the door movement and also of the position of the door, in a guide on the inside of a forward hinged vehicle door, between a position at front top and a position at bottom rear on the inside wall of the door.

With a passive safety-belt system, the passenger in an automobile is relieved of the normal manipulations required for putting on and taking off a safety belt. The invention is based upon the problem of producing the simplest possible, and yet operationally safe belt locking arrangement for such a passive safety-belt system, taking into account as far as possible all the special contingencies which may arise in operation. The belt locking arrangement has to guarantee both the greatest possible safety and the greatest possible comfort and convenience for the passengers, and while doing so must be of compact, simple and easily installed construction. Any disturbing factors such as cumbersome objects in the automobile need to be eliminated as far as is possible.

SUMMARY OF THE INVENTION

The pre-requisites for the resolution of this problem are created in accordance with the invention in that the auxiliary driving power is linked to the lock through a flexible push-pull member that runs in a guide sleeve installed in the wall of the door and exhibits a longitudinal slot opening towards the interior of the vehicle, through which a carrier slide rigidly connected to the push-pull member protrudes and is connected to the lock. In this way readily movable positive guidance of the lock between its two limit positions is created which neither causes any disturbance within the vehicle nor can be impeded through being trapped or unexpectedly impeded by objects within the vehicle, and above all makes possible a certain mutual enforced guidance of lock and lock tongue.

BRIEF DESCRIPTION OF THE DRAWINGS

The invention will now be described in more detail by way of example with reference to the accompanying drawings, which show parts of one embodiment of the new belt locking arrangement. In the drawings.

DESCRIPTION OF THE PREFERRED EMBODIMENT

Figure 1:
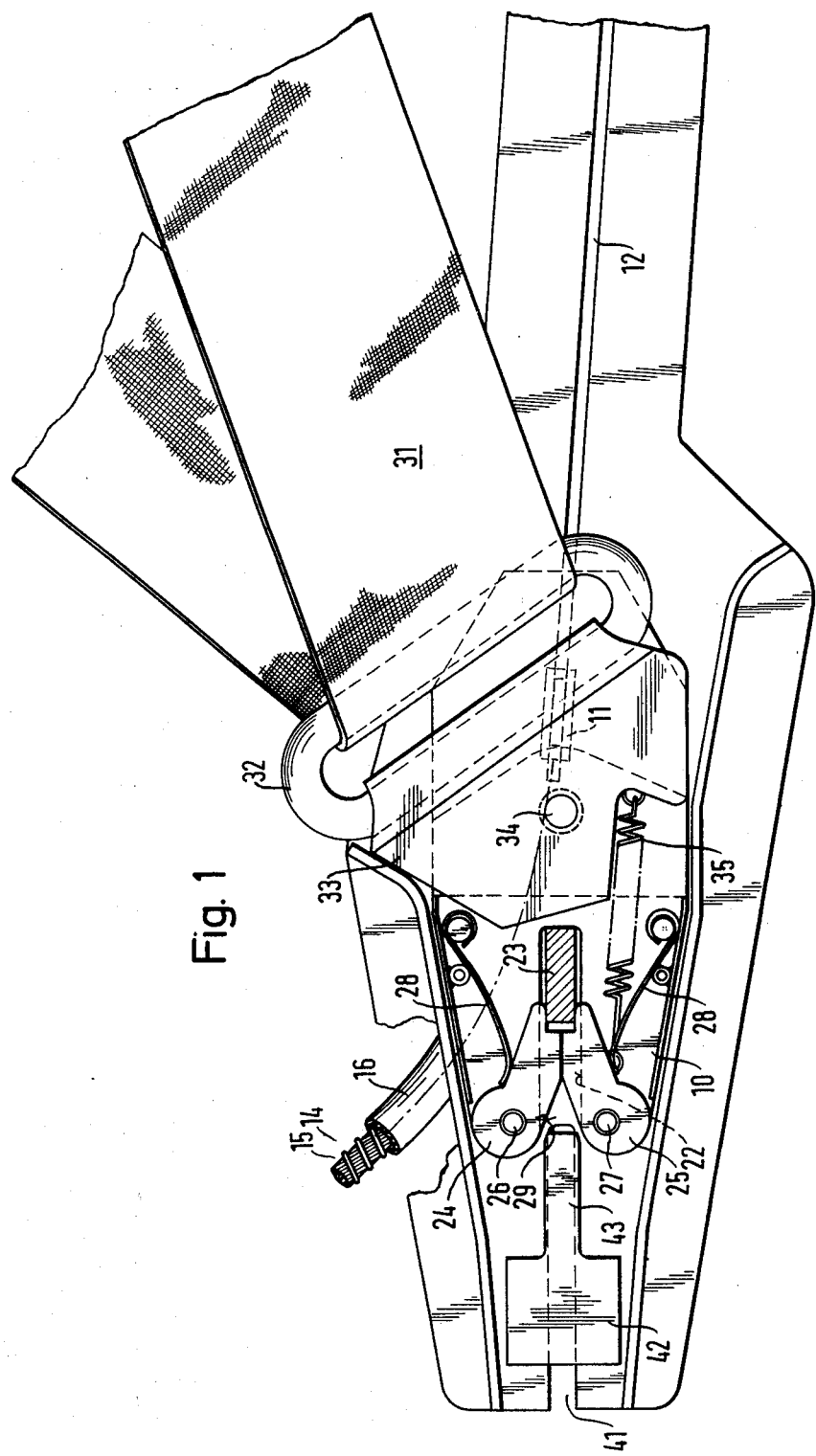
FIG. 1 is an elevation view of a lower end of a lock guide track with a belt lock latched on to a fixed lock tongue, with a covering and lock cover plate removed.

In the drawings a belt lock 10, is connected to a transporting slide 11 that protrudes through an elongate slot 12 into a guide sleeve 13 and is connected within the guide sleeve 13 to a push-pull member in the form of a stiff wire cable 14. The wire cable 14 is provided over at least a part of its length with a solidly applied wire winding 15, by means of which a form of rack rod is constituted. Through an outer casing 16 (top left in FIG. 1), the wire cable 14 provided with the wire winding 15 is led to a pinion (not illustrated) engaging in the intervals of the wire winding 15. The pinion is carried on the output shaft of an electric motor powered from the vehicle battery, that is provided as an auxiliary power drive for the movement of the lock.

The belt lock 10 has two substantially U-shaped cover plates 20, and 21, which leave between them an unimpeded, forwardly opening gap 22 for the lock tongue 23. The cover plates 20 and 21 have substantially similar contours and are disposed spaced apart and parallel to one another. Between the front ends of the cover plates, two symmetrically formed claws 24 and 25 are pivotably carried on bearing spigots 26 and 27 respectively. The claws are subject to the action of return springs 28 which push the claws together in the zone of the gap 22. The claws 24, 25 are formed with oblique faces 29 towards the front of the lock 10 and with latches 30 at the rear of the lock for cooperation with the lock tongue 23.

Figure 3:
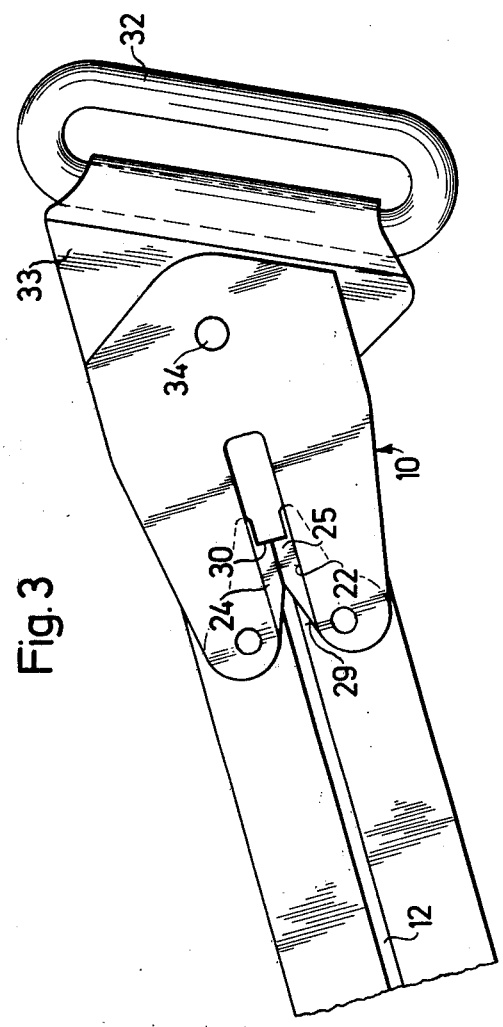
FIG. 3 is an elevation view of the upper end of the lock guide track with the belt lock at that point.

An oval link 32 of the lock serves to guide a belt strip 31 and is carried by a third plate 33 which is disposed between the cover plates 20 and 21 and may pivot over a restricted arc about a journal 34 between two limit positions. The plate 33 is subject to the action of a return spring 35 which urges the plate into one of its limit positions between the two cover plates, and may be moved against the action of this return spring 35 into the other limit position, so as to be able to match automatically the attitude of the guide slot 32 relative to the direction of pull of the belt 31 at any position of the lock 10 along the guide sleeve. FIG. 1 shows the limit position the plate 33 may take up against the tensioning force of the spring 35. FIG. 3 shows the other limit position, in which the spring 35 is unloaded.

While the belt lock 10 is normally supported by the vehicle door, the lock tongue 23, intended to engage in the belt lock, is rigidly fixed to the vehicle body, preferably on the inside of the threshold of the door. In its position bolted to the lock tongue 23, the belt lock 10 may be unbolted as desired by a release device coupled to the door lock and operable from inside or outside the vehicle, or from inside the vehicle by an unlocking device mounted on the vehicle body and independent of the operation of the door lock. Between the lock 10 and the transporter slide 11, an emergency separation point in the form of a connecting pin 40 (illustrated in FIG. 2) is provided, which snaps if, in an accident, the vehicle door springs open, so that even in such a case the bolting of the belt lock is maintained and the vehicle passenger protected by the belt remains held in the seat.

In normal use release of the lock 10 latched to the lock tongue 23 is effected by a release device 42 displaceable along a guide 41, one end 43 of which can penetrate between the oblique faces 29 of the lock latches 24 and 25 and unbolt them. The release device 42 is connected either directly or indirectly with the inside and the outside door lock handles through at least one bowden cable 45 and having a return spring 46. As an emergency unlocking device there is also provided inside the car, preferably behind the threshold of the door, an additional device (not illustrated) with a part pivotable by a hand lever and so disposed that, if the vehicle door and with it the release device 42 is thrown from the vehicle, the lock should still remain latched to the lock tongue 23. This pivotable part may be led between the oblique faces 29 of the latches 24 and 25, so that the lock may be unlatched in this way also.

Figure 2:
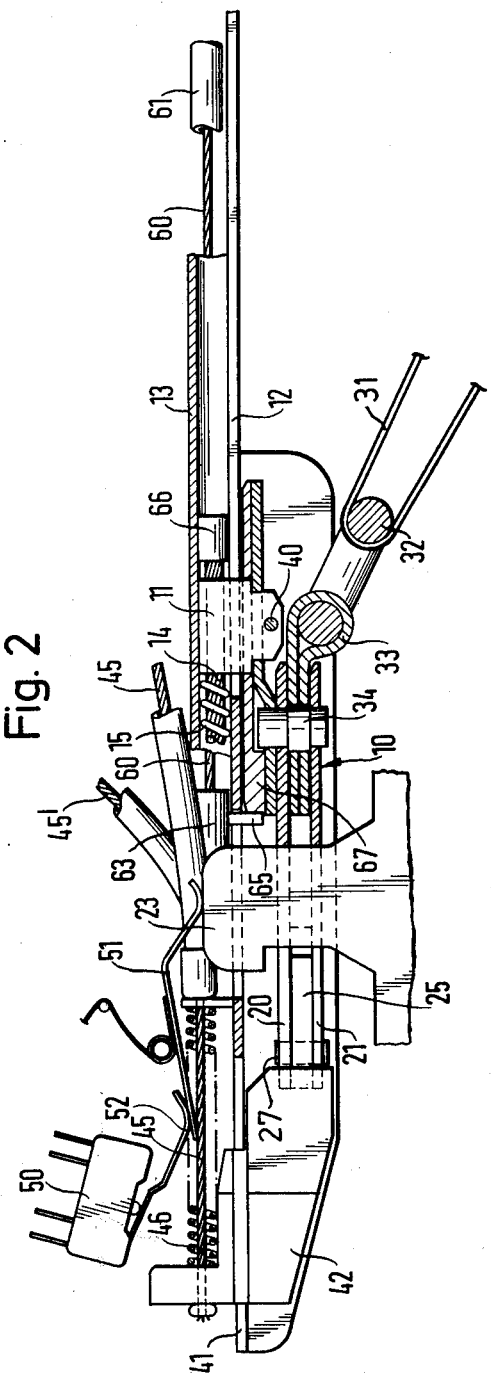
FIG. 2 is a plan view from above of the arrangement of FIG. 1, partly in section.
Figure 4:
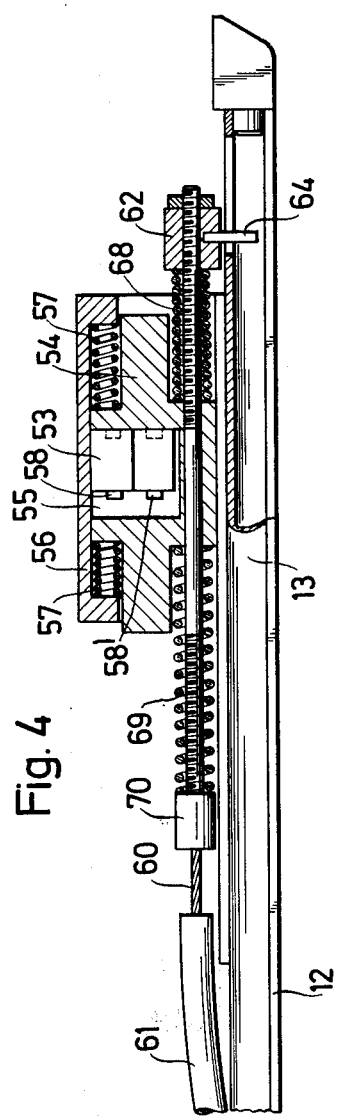
FIG. 4 is a plan view of the upper end of the belt lock guide track, partly in section, with the belt lock removed.
Figure 5:
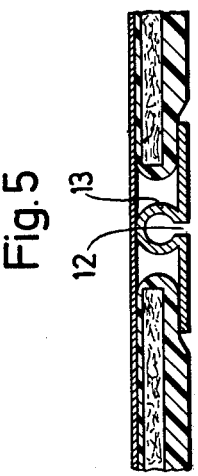
FIG. 5 shows a part of the wall of the vehicle door in section with the section profile of the guide sleeve built into it.

The electric motor built into the vehicle door as an auxiliary drive is supplied with power from the vehicle battery and is reversible through an electric changeover switch and controllable by limit switches disposed at the ends of the belt lock guide and also by door and seat switches. The door switch 50, installed in the vehicle door, is switched on when the door is closed. Switch 50 is operated by a spring-loaded rod 51 striking against the lock tongue 23 and is switched off when the door is opened by the retractive force of its spring 52. A limit switch 53 is actuated when the lock 10 reaches either of its limit positions. An actuating member 54 is displaceably disposed through a free passage 55 within a housing 56 against the force of return springs 57. In the position as drawn the contacts (not visible in the drawing (FIG. 4)) on the right side of the switch 53 are operated and the contacts 58 visible on the left side of the switch 53 are open. The movement of the actuating member 54 is effected in relation to the limit position of the lock 10 at any time through a bowden cable 60, which runs in a flexible casing 61. In FIG. 2 this bowden cable 60 is illustrated as running behind the guide sleeve 13 with the pull and push member 14 and 15. On the ends of the bowden cable 60 are positioning cylinders 62 and 63, having strikers 64 and 65 respectively. The striker 64 is in the path of a positioning cylinder 66 on the front end of the pull and push member 14 and 15 and the striker 65 is in the path of an extension 67 on the belt lock 10. Damping springs 68 and 69 are positioned between the actuating member 54 of the limit switch 53 and the positioning cylinders 62 and 70 on the bowden cable 60.

Figure 6:
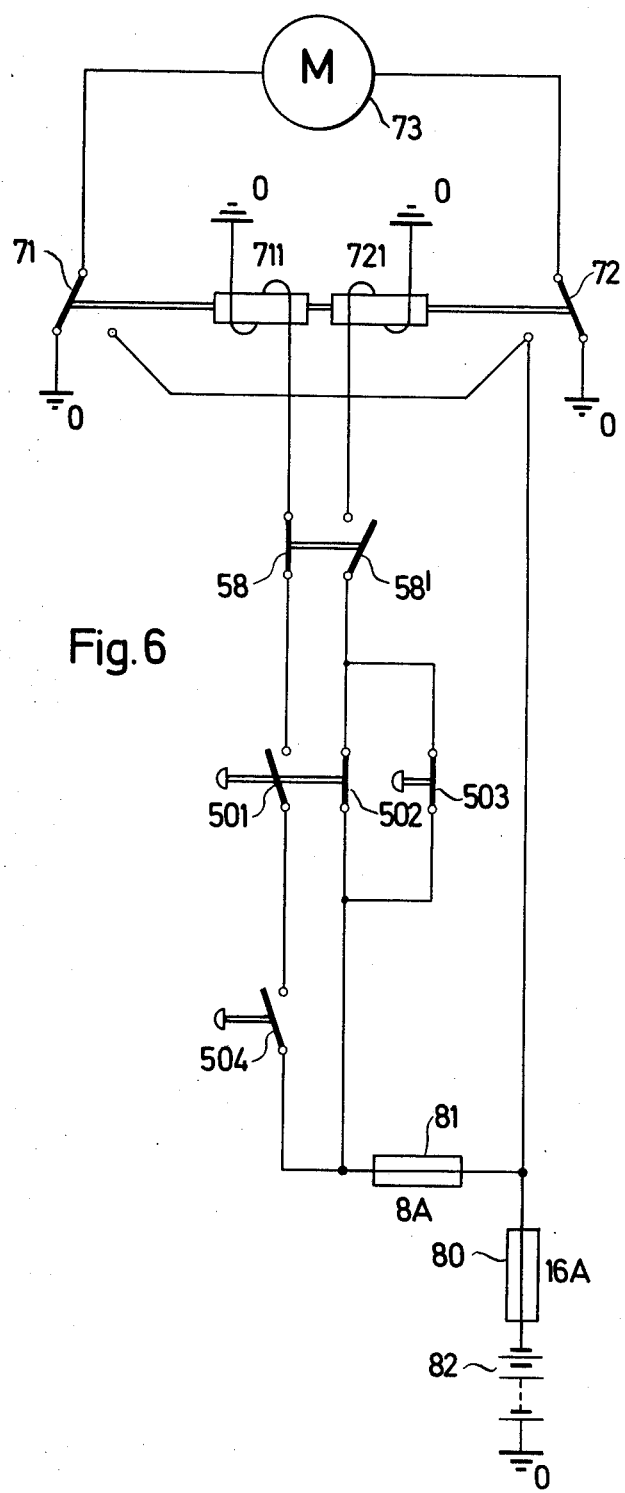
FIG. 6 is a schematic electrical circuit diagram for the control of the electric motor.

In the electrical circuit diagram of FIG. 6, an electric motor 73 provided as an auxiliary power drive can be switched on and off and reversed through two electromagnetic control switches 71 and 72. The circuit diagram shows the condition with the motor switched off, in which it is grounded to the vehicle across both reversing switches. A plurality of control contacts is disposed in the control-current circuits of the windings 711, 721 of the two reversing switches, the first of which are the interconnected limit switch contacts 58, 58' of which at any time, as explained above in connection with the description of the limit switch 53, one is open and the other is closed. These contacts are shown in the condition they adopt with the belt in the upper limit position. The diagram also shows two interconnected door switch contacts 501, 502 for the door switch 50 described above. These two contacts are shown in the condition adopted with the door open. Parallel to the door switch contact 502 is a control contact 503 operable in dependence upon the position of the belt lock, this switch, which is not shown in the other figures, being closed if the lock is not bolted and open when the lock is bolted. A contact 504 is provided in the control lead of the electro-magnetic switch winding 711 which is closed when the passenger takes his seat and is opened, as illustrated, when the seat is unoccupied. Fuses 80 and 81 for 16 and 8 Amps respectively are also incorporated in the control circuit. The vehicle battery 82 is connected into the main lead between the fuse 80 and the body of the vehicle, which is identified by O.

The manner of working is as follows:

If the car is unoccupied and the vehicle door is closed, then the lock 10 is to the front in its uppermost position in accordance with FIG. 3. If the door is opened, then, by means of bowden cable 60 actuated from the door handle or the door lock, the release device 42 (FIGS. 1 and 2) is moved to the right and the lock unbolted. When the door is opened the spring loading strip 51 is moved away from the belt tongue 23 mounted in the vehicle, with the effect that the door switch 50 is mechanically actuated, so that its contact 501 (FIG. 6) closes and the contact 502 opens. In this way the current circuit is made ready for the magnetic winding 711 of the control switch 71. As soon as the entering traveller takes his seat in the vehicle, the seat contact 504 is closed. Through this the control switch 71 is reversed and a voltage is connected across the motor 70 such that it moves in a direction of rotation to transport lock 10 from the position illustrated in FIG. 3 to the position illustrated in FIGS. 1 and 2. On arrival at the position shown in FIGS. 1 and 2 the lock actuates the bowden cable 60 mechanically through the strikers 65 and 67 thereby reversing the limit switch 53, so that its contact 58 is opened and its contact 58' is closed. As it has reached its lowest position, the lock 10 is latched by means of its latches 24, 25 onto the lock tongue 23, and the belt strip 31 is positioned about the vehicle passenger. The release device 42 is returned to the location illustrated in FIGS. 1 and 2 by means of its return spring 46.

The normal release of the belt lock after the completion of the journey is effected upon actuation of the door lock from the inside of the vehicle. The release device 42 (FIGS. 1 and 2) is moved to the right by the action of bowden cable 45, so that it enters between the latches 24 and 25 of the lock and unlatches these from the lock tongue 23. When the door is opened the control switch 50 is again actuated through the spring-loaded arm 51, so that its contacts 501 and 502 take up the positions shown in FIG. 6. Since at the lower limit position of the lock the limit-switch contacts 58, 58' take up the opposite positions, as shown in FIG. 6, the magnetic winding 721 of the control switch 72 is excited, and a voltage is connected across the motor 73 such that it reverses its direction of rotation. The motor now transports the unlatched lock 10 from its lower position (illustrated in FIGS. 1 and 2) into its upper position (illustrated in FIG. 3). In this position the positioning cylinder 66 collides with the striker 64, with the result that the limit switch 53 with its contacts 58, 58' is reversed, the magnetic winding 721 is no longer excited and the motor 73 is stopped by the opening of the control switch 72.

If during the journey with a belted-in traveller the vehicle door should be forcibly thrown off the vehicle by an accident, then the emergency fracture point, which is for example constituted by the connecting pin 40 between the lock and the transporter slide 11, is actuated. The pin snaps, and the lock 10 is detached from the transporter slide 11 and thus from the vehicle door. Thus the lock remains latched to the lock tongue 23 located in the vehicle, and even in this situation, the passenger in the vehicle remains belted-in and protected. He can, however, as soon as the vehicle has come to rest, be released from the belt either by his own efforts or by another person by means of the emergency unbolting device on the body of the vehicle described above.

While a specific embodiment of the invention has been shown and described in detail to illustrate the application of the principles of the invention, it will be understood that the invention may be embodied otherwise without departing from such principles.

What we claim is:

1. A belt locking arrangement for a passive safety-belt system for automotive vehicles having a forwardly hinged vehicle door, wherein a belt lock is movable in a guide on the inner surface of the door into and out of locking engagement with a lock tongue secured to the body of the vehicle, by an auxiliary power drive, said arrangement comprising, in combination, a guide sleeve built into the door and formed with a slot opening toward the interior of the vehicle; a flexible push-pull member running in said guide sleeve and connected to said auxiliary drive for operation thereby; and a transporter slide extending through said slot and connected to said push-pull member and to said belt lock; said lock comprising two substantially U-shaped cover plates spaced from and extending parallel to one another to define therebetween an open forward-facing gap for said lock tongue; a pair of symmetrically formed claws pivotally mounted between the front ends of said cover plates; said claws having oblique faces directed toward the front and opposing each other in the zone of said forward-facing gap; and respective return springs biasing said claws to engage their oblique faces with each other.

2. A belt locking arrangement according to claim 1, including a link member forming an elongated slot for guidance of a safety belt; a third plate carrying said link member and pivotally mounted between said two cover plates for movement between two limit positions; a return spring operatively associated with said third plate and biasing said third plate into one of said limit positions, said third plate being movable against the bias of said return spring into the other of said limit positions so as to enable the automatic matching of the attitude of said guide slot to the direction in which the safety belt extends at any position of said lock along said guide sleeve.

3. A belt locking arrangement, according to claim 1, in which said symmetrically formed claws have cooperating abutments at their rear ends operable to engage and lock said lock tongue upon movement of said transporter slide toward said lock tongue for said lock tongue to enter between said oblique faces and spread said claws apart for passage therebetween.

4. A belt locking arrangement according to claim 1, including a release device operatively associated with said lock and coupled to the door lock for operation from inside and outside the vehicle to release said lock from its locked position; and an unlocking device mounted on the vehicle body and operable from inside the vehicle to release said lock from its locked position and independent of the operation of the door lock.

5. A belt-locking arrangement according to claim 1, including a breakable pin connecting said transporter slide to said lock, said breakable pin fracturing responsive to the vehicle doors springing open in an accident so that, in such case, said belt-lock remains in locking engagement with said lock tongue secured to the body of the vehicle so that the passenger protected by the belt remains held in the seat.

* * * * *